Oct. 24, 1944.  N. A. RINGHOLZ  2,361,124
LOCKING TAB
Filed Sept. 28, 1942  3 Sheets-Sheet 1

INVENTOR.
Norbert A. Ringholz
BY Evans & McCoy
ATTORNEYS

Oct. 24, 1944.   N. A. RINGHOLZ   2,361,124
LOCKING TAB
Filed Sept. 28, 1942   3 Sheets-Sheet 2

INVENTOR.
Norbert A. Ringholz
BY Evans & McCoy
ATTORNEYS

Oct. 24, 1944.   N. A. RINGHOLZ   2,361,124
LOCKING TAB
Filed Sept. 28, 1942    3 Sheets-Sheet 3

INVENTOR
Norbert A. Ringholz
BY Evans & McCoy
ATTORNEYS

Patented Oct. 24, 1944

2,361,124

UNITED STATES PATENT OFFICE 2,361,124

LOCKING TAB

Norbert A. Ringholz, Sandusky, Ohio, assignor to The Hinde & Dauch Paper Company, Sandusky, Ohio, a corporation of Ohio Application September 28, 1942, Serial No. 459,885

4 Claims. (Cl. 229—45)

This invention relates to corrugated board boxes, and boxes made of similar materials, and has for its purpose the provision of a lock or fastening for such boxes which is particularly adapted for use in the bottoms thereof to provide a fastening which will not intrude upon the packing space of the box, and which will not readily become unfastened, and which will be of sufficient inherent strength so that the bottom will not come open by reason of any loads in the box short of those which will destroy the material by breaking.

Another purpose of my invention is to provide a lock of the character described which will not interfere with the flat folding of the box elements before the box is set up, and which can readily be assembled and closed quickly by unskilled help without requiring the use of machinery, stapling, taping or other extraneous aids.

In the accompanying drawings and specification I disclose certain preferred embodiments of the invention, it being understood, however, that the invention is susceptible of being made in modified forms and proportions all within the scope of the invention as set out in the claims appended hereto.

Figure 1:
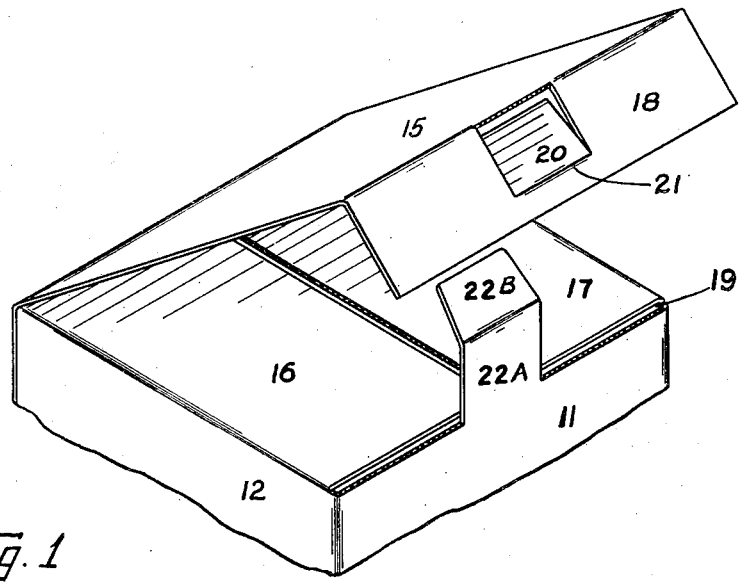
Figure 1 is a perspective showing the bottom open with the parts being moved towards a closing position.

Referring now to the form shown in Figs. 1 to 7 inclusive, the front wall of the box is identified by reference character 11, one side wall by 12, the other side wall by 13, the back by 14, and the bottom by 15.

The top of the box, which is not shown, may be of any conventional construction. Half laps or other laps 16 and 17 are hinged respectively to the lower edges of the sides 12 and 13. The bottom 15 carries a tuck 18 along its free end which, when the box is closed is disposed inside and against the front 11, the laps 16, 17 being slightly shortened so as to leave a space 19, Fig. 1, for this purpose.

A tab 20 is cut out of the tuck 18, being severed therefrom along the hinge line between 15 and 18 and by two cuts at an angle to that line which extend to slightly short of the free edge of the tuck 18, thus leaving a hinge line 21 parallel to such free edge, so that the tab 20 can either lie in the plane of the tuck 18 or be swung inward therefrom. The tab 20 is preferably cut off a short distance from the hinge line of the tuck and bottom closure to permit the entrance of a locking tongue 22, about to be described. The tongue 22 projects from and is preferably integral with the bottom edge of the front 11. Tongue 22 projects from the face 11 in a position to register with the tab 20 of the bottom 15 and is preferably divided into two sections 22A and 22B by hinge lines, the body portion 22A being in prolongation of the bottom edge of the box front 11, and the tip portion 22B being hinged to the body portion of the tongue parallel to the first hinge line and preferably about midlength of the tongue.

Figure 2:
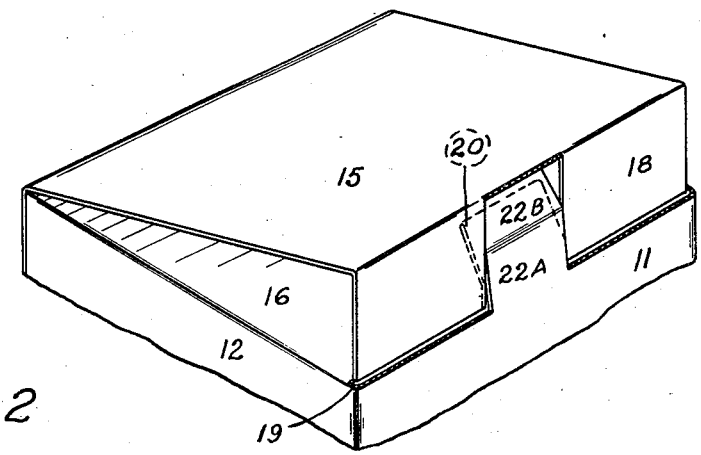
Fig. 2 is a corresponding perspective showing the elements in the next stage towards closing.
Figure 3:
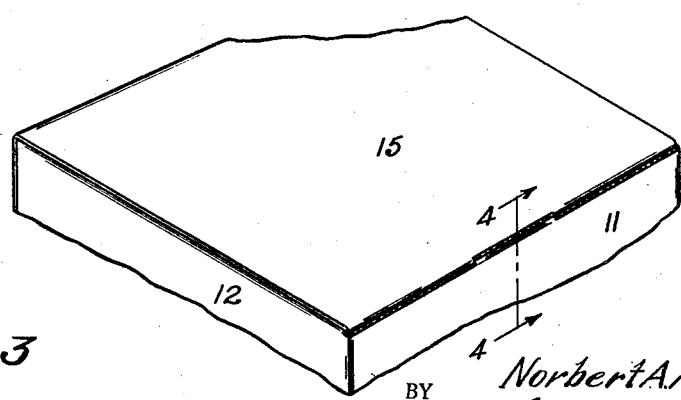
Fig. 3 is a corresponding perspective showing the bottom closed with all parts locked in place.
Figure 4:
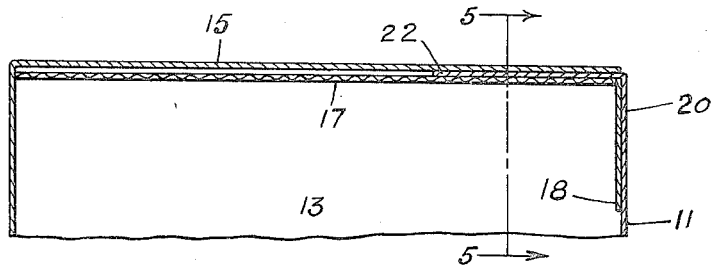
Fig. 4 is a transverse vertical section taken as indicated by the arrows 4—4 of Fig. 3.
Figure 5:
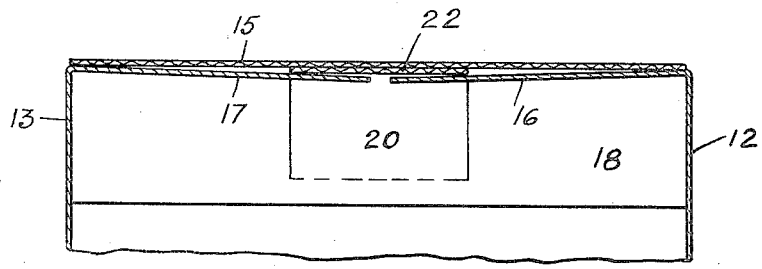
Fig. 5 is a longitudinal vertical section taken as indicated by the arrows 5—5, Fig. 4.
Figure 6:
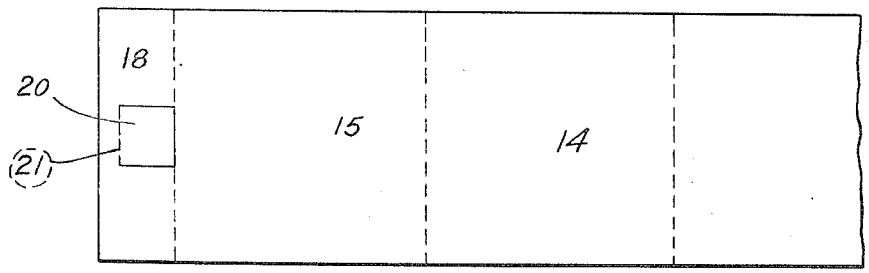
Fig. 6 shows the blank for one portion of the box.
Figure 7:
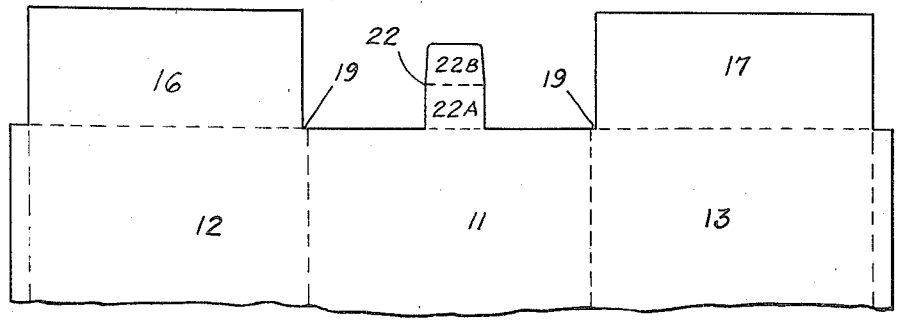
Fig. 7 shows the blank for another portion of the box.

When the box is closed the tuck 18 is put into the space 19 inside and against the front wall 11, and simultaneously with this movement, the tab 20 is turned back inward as can be seen in Figs. 1 and 2, while the tip 22B of the tongue 22 is also turned inward to underlie the bottom panel 15, and since the tongue is hinged in the middle, this tip guides the entire tongue into position as the bottom is brought to the full closed position of Fig. 3. Thus the tongue 22 comes to the position shown in Fig. 5. When the tongue 22 is brought in and underlies the bottom 15, the tab 20 is brought down into its engagement with the base of the tongue, as best seen in Figs. 3 and 4, and the box has its bottom completely fastened. The laps 16 and 17 are in a substantially horizontal position whereby their front edges bear against the tab 20 and prevent it from being moved out of the vertical locking position. Thus a triple locking effect is established between the tabs 16, 17, the tab 20 and the tongue 22.

In the modification shown in Figs. 8 to 12 inclusive, the parts are for the most part similar to those in Figs. 1 to 7 inclusive, and for convenience corresponding parts are designated by the same reference characters with primes added. The tongue 25 is attached to the front panel 11' by a fold line and is provided with a tip also attached to the tongue 25 by a fold line, the fold lines being indicated by dashes. On the sides of the body portion of the tongue 25 are disposed foldable wings 27, 28, one on each side.

Figure 9:
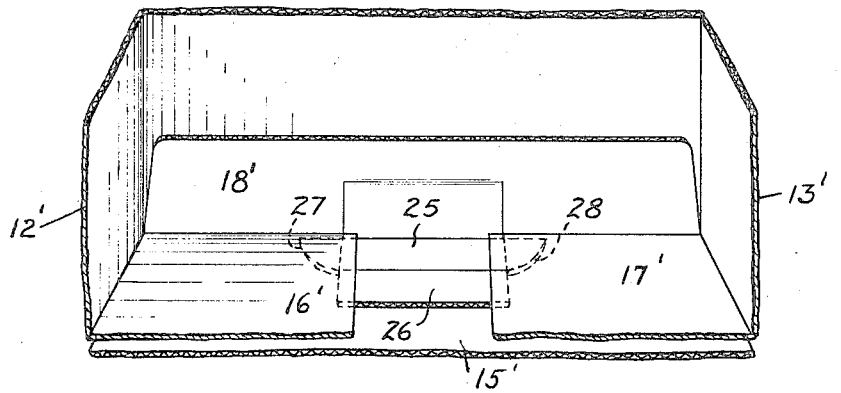
Fig. 9 is an internal perspective of the modified form of the box shown in Fig. 8 looking at the inside of the bottom closure and front wall of the box, only parts of the front, bottom and side walls being shown. This view shows the bottom closure, the tuck, the tab, the tongue and the hinged laps in closed position.
Figures 8, 10:
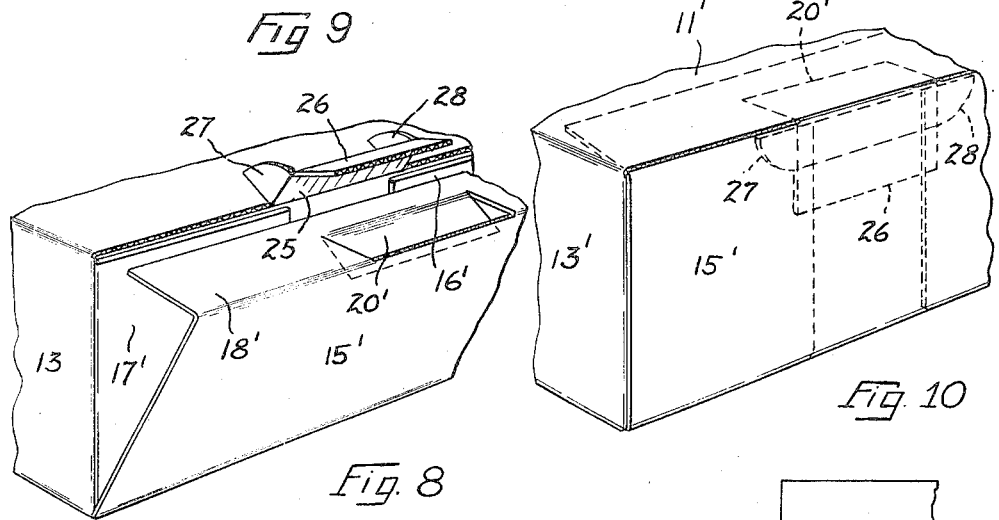
Fig. 8 is a perspective of a modified form of a box provided with a bottom locking closure showing the bottom being moved toward closing position.
Fig. 10 is a view similar to Fig. 8 of the exterior of the box with the parts in closed position.
Figure 11:
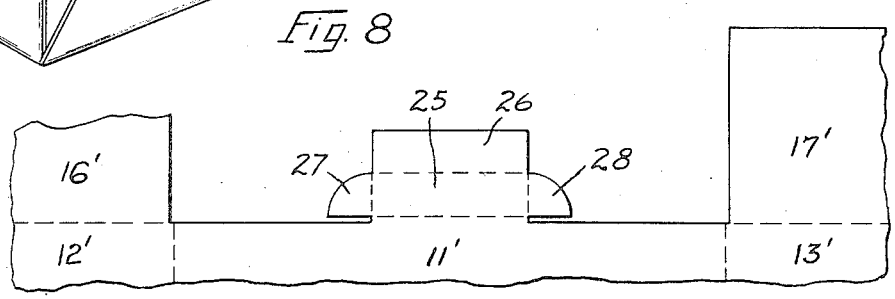
Fig. 11 is a partial plan view corresponding to Fig. 7, of part of the modified blank of the box of Fig. 8.
Figure 12:
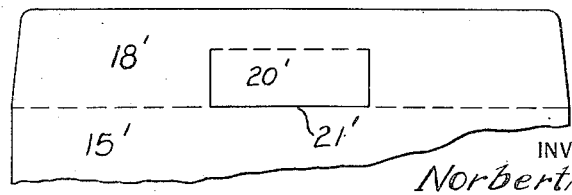
Fig. 12 is another partial view corresponding to Fig. 6 of the box blank of the modified form of Fig. 8.

In Fig. 8 is shown the position of the parts of the lock immediately before closure and Figs. 9 and 10 show the position of the parts after closure, when the parts are locked in a manner similar to that shown in Figs. 1 to 7, but the operation will now be described.

To accomplish the locking the wings 27, 28 are folded substantially at right angles to the tongue 25, so they extend outward and the tip 26 of the tongue 25 is turned inward to enter the recess of the struck out tab 20' of the tuck 18'. As the bottom panel 15' is brought into closed position the tip 26 facilitates entry of the tongue 25 against the inner portion of the bottom panel 15' and the wings 27, 28 follow the tongue 25. Further movement of the panel 15' causes the members 25, 26, 27, 28 to lie flat between the inside of the bottom panel 15' and the laps 16', 17', as readily seen in Figs. 9 and 10. By having the wings 27, 28 turned outwardly the tongue can be more readily inserted in the tuck 18', and after the tongue is entirely inside the bottom of the box, the wings will readily assume the flat position. After the bottom panel 15' is entirely closed, the tab 20' engages the inner face of the tongue 25 holding it in tight frictional engagement with the bottom panel 15' and the laps 16', 17' holding the tab 20' in tight frictional engagement with the inside of the front wall 11' of the box, thus giving a triple locking effect similar to that in the form shown in Figs. 1 to 7 inclusive.

Having described a preferred embodiment of my invention and a modification thereof, it is to be understood that I do not limit myself thereto, but that the invention is susceptible of modification and changes, all within the scope of the following claims.

What I claim is:

1. In a fibrous box having front, back and side walls, a bottom closure hinged to the lower part of the back wall and bottom laps hinged to the side walls and having their free ends in spaced relation, a bottom locking structure comprising a tuck hinged to and carried by the bottom closure, a tab severed from the tuck along the hinge line of the tuck and the bottom closure and by two cuts at an angle to that line, said tab being free to swing inward and having its free edge disposed slightly short of the hinge line, a tongue carried by the front wall of the box and projecting from an edge thereof in registry with the tab of the tuck, and tongue being hinged to the front wall of the box and having a tip portion hinged to the body portion of the tongue, the tip portion of the tongue being adapted to enter the space between the tab and the body portion of the bottom closure as the latter is being closed, said tongue being of a width greater than the space between the free ends of said laps and disposed between the hinged laps and bottom closure when the bottom closure is in closed position, and said tab overlying the front wall of the box and having its end portion bearing against the inner face of the tongue.

2. In a fibrous box having front, back and side walls, a bottom closure hinged to the lower part of the back wall and bottom laps hinged to the side walls and having their free ends in spaced relation, a bottom locking structure comprising a tuck hinged to and carried by the bottom closure, a tab severed from the tuck along the hinged line of the tuck and the bottom closure and by two cuts at an angle to that line, said tab being free to swing inward and having its free edge disposed slightly short of the hinge line, a tongue hingedly carried by the front wall of the box and projecting from an edge thereof and having a wing at each side thereof adapted to be folded at right angles to the body portion of the tongue, said tongue and wings being adapted to enter the aperture of the tuck when the tab is bent inward as the bottom closure is being pushed into closed position, said tongue being of a width greater than the space between the free ends of said laps, and portions of said tongue and wings being disposed between the hinged laps and the bottom closure when the latter is in closed position, said tab being disposed adjacent the front wall of the box and having its end portion bearing against the inner face of the tongue.

3. In a fibrous box having front, back and side walls, a bottom closure hinged to the lower part of the back wall and bottom laps hinged to the side walls and having their free ends in spaced relation, a bottom locking structure comprising a tuck hinged to and carried by the bottom closure, a tab severed from the tuck along the hinge line of the tuck and the bottom closure and by two cuts at an angle to that line, said tab being free to swing inward and having its free edge disposed slightly short of the hinge line, a tongue hingedly carried by the front wall of the box and projecting from an edge thereof and comprising a body portion and a tip portion hinged thereto, said tongue having a wing at each side thereof adapted to be folded outwardly at right angles to the body portion of the tongue, said tongue and tip being adapted to enter the aperture of the tuck when the tab is bent inward as the bottom closure is being pushed into closed position, said tongue being of a width greater than the space between the free ends of said laps, the tongue and tip and side wings being disposed between the bottom closure and the hinged laps when the bottom closure is in closed position, said tab being disposed adjacent the front wall of the box and having its end portion bearing against the inner face of the tab.

4. A fibrous box having front, back and side walls, and a bottom closure hinged to the back wall, a bottom locking structure comprising a tuck hinged to the bottom closure along the free edge thereof and adapted to engage the inner face of the front wall, said tuck having a slot therein along its hinged edge, a flexible tongue carried by the front wall in registry with said slot and adapted to be entered into said slot when the bottom closure is near its closed position, a tongue locking tab carried by said tuck in a position to partially close said opening, said tab being bendable inwardly about an axis spaced from the hinged edge of the tuck to permit the tongue to enter the slot and having a free edge engageable with the tongue when the tab is moved outwardly to press the same against said bottom closure, and a lap hinged to a side wall of the box and adapted to overlie the top face of said bottom closure, said lap having a front edge closely adjacent the inner face of the tuck that engages with the inner face of said tab and presses the same outwardly, whereby said tab is held in locking engagement with said tongue by said lap and said lap is held in position by frictional engagement with said tab.

NORBERT A. RINGHOLZ.